(12) United States Patent
Park et al.

(10) Patent No.: US 9,187,362 B2
(45) Date of Patent: Nov. 17, 2015

(54) TRANSPARENT COMPOSITE MATERIAL AND A PRODUCTION METHOD THEREFOR

(75) Inventors: Deokhai Park, Daegu (KR); Eunseck Kang, Gyeonggi-Do (KR); Kyungho Jung, Seoul (KR); Namseok Kang, Gyeonggi-Do (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 13/877,498

(22) PCT Filed: Dec. 22, 2011

(86) PCT No.: PCT/KR2011/009978
§ 371 (c)(1),
(2), (4) Date: Apr. 3, 2013

(87) PCT Pub. No.: WO2013/005902
PCT Pub. Date: Jan. 10, 2013

(65) Prior Publication Data
US 2013/0196843 A1  Aug. 1, 2013

(51) Int. Cl.
*C03C 13/00* (2006.01)
*C03C 25/40* (2006.01)
*C08J 5/24* (2006.01)
*C08K 7/14* (2006.01)
*C08L 83/04* (2006.01)
(Continued)

(52) U.S. Cl.
CPC ............ *C03C 13/00* (2013.01); *C03C 25/40* (2013.01); *C08J 5/043* (2013.01); *C08J 5/08* (2013.01); *C08J 5/24* (2013.01); *C08K 7/14* (2013.01); *C08L 83/04* (2013.01); *C08J 2383/04* (2013.01); *C08J 2385/00* (2013.01)

(58) Field of Classification Search
CPC .............................. C03C 13/00; C03C 25/40
USPC .................... 501/32; 427/163.2, 513; 524/494
See application file for complete search history.

(56) References Cited

U.S. PATENT DOCUMENTS

| 4,076,684 A | 2/1978 | Wohlfarth et al. |
| RE29,697 E | 7/1978 | Mink |
| 4,719,142 A | 1/1988 | Modic |

(Continued)

FOREIGN PATENT DOCUMENTS

| DE | 199 34 407 A1 | 1/2001 |
| EP | 0 842 967 A2 | 5/1998 |

(Continued)

OTHER PUBLICATIONS

Eo et al.,"Optical characterisitics of photo-curable methacryl-oligosiloxane nano hybrid thick films", Database Accession No. 8516535, Journal of Materials Research, vol. 20, No. 2, Feb. 2005, 1 page, XP002719125.

*Primary Examiner* — Ling Choi
*Assistant Examiner* — Catherine S Branch
(74) *Attorney, Agent, or Firm* — Birch, Stewart, Kolasch & Birch, LLP

(57) ABSTRACT

This specification relates to a colorless composite material capable of retaining transparency within a wide temperature range by impregnating glass composition (glass fibers) with inorganic-organic hybrid resin. A colorless composite material according to exemplary embodiments includes glass fibers, and inorganic-organic hybrid resin consisting of inorganic bonds and organic bonds, wherein the inorganic bonds are Si—O—Si bonds or Si—O-M bonds and M denotes a metallic element.

1 Claim, 2 Drawing Sheets

(51) Int. Cl.
*C08J 5/04* (2006.01)
*C08J 5/08* (2006.01)

(56) References Cited

U.S. PATENT DOCUMENTS

| | | |
|---|---|---|
| 5,120,339 A | 6/1992 | Markovich et al. |
| 6,187,426 B1 | 2/2001 | Jonschker et al. |
| 6,852,822 B1 | 2/2005 | Bissinger et al. |
| 2007/0142573 A1 | 6/2007 | Kodama |
| 2009/0052856 A1 | 2/2009 | Bae et al. |
| 2010/0178478 A1 | 7/2010 | Bae et al. |
| 2014/0288236 A1* | 9/2014 | Depierro et al. ............... 524/588 |

FOREIGN PATENT DOCUMENTS

| | | |
|---|---|---|
| JP | 2010-163601 A | 7/2010 |
| KR | 10-2005-0108787 A | 11/2005 |
| KR | 10-0558965 B1 | 3/2006 |
| KR | 10-2006-0110388 A | 10/2006 |
| KR | 10-2010-0083697 A | 7/2010 |

* cited by examiner

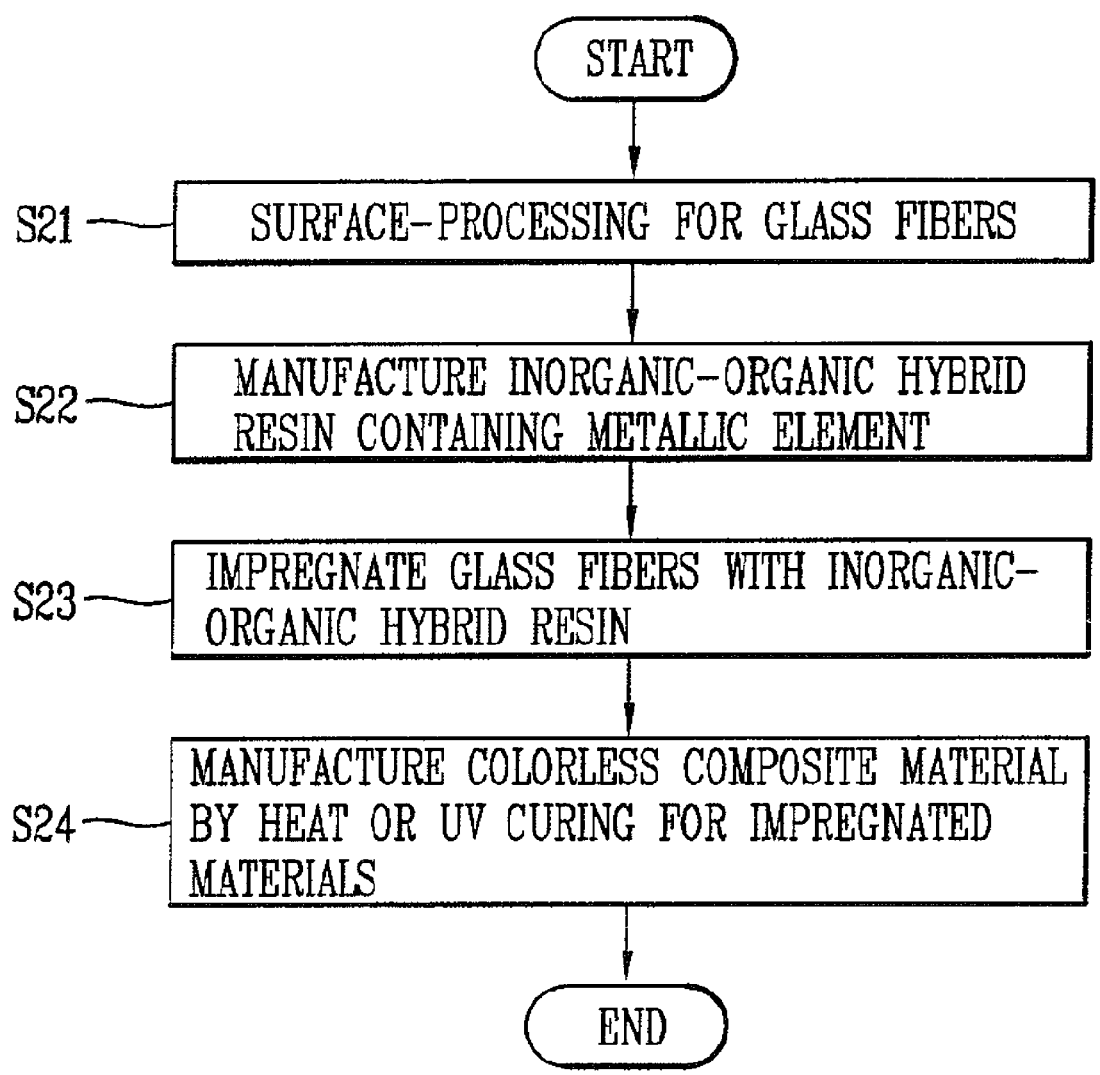

TRANSPARENT COMPOSITE MATERIAL AND A PRODUCTION METHOD THEREFOR

TECHNICAL FIELD

The present disclosure relates to a colorless composite material and a method for manufacturing the same.

BACKGROUND ART

In general, glass or plastic is used as a transparent material. However, the glass is fragile and the plastic is weak to a strong impact or force. This is leading to development of colorless composite materials. The related art colorless composite material is manufactured by impregnating glass fibers with typical transparent resin. However, the glass fiber and the typical transparent resin exhibit a great difference in, a refractive index variation according to the change of temperature. This may cause an optical transmittance variation according to the change of temperature.

DISCLOSURE OF THE INVENTION

Therefore, an aspect of the detailed description is to provide a colorless composite material capable of retaining transparency within a wide temperature range by way of impregnating organic composition (glass fibers) with inorganic-organic hybrid resin, and a manufacturing method thereof.

To achieve these and other advantages and in accordance with the purpose of the present invention, as embodied and broadly described herein, there is provided a colorless composite material including glass fibers, and inorganic-organic hybrid resin consisting of inorganic bonds and organic bonds. The inorganic bonds may be Si—O—Si bonds or Si—O-M bonds, and M may denote a metallic element including silicon.

In accordance with one exemplary embodiment of the present disclosure, the Si—O—Si bonds may be in a ratio of 30% to 60% by weight.

In accordance with one exemplary embodiment of the present disclosure, a thermo-optic coefficient of the inorganic-organic hybrid resin may be $-5 \times 10^{-5}/°C. \sim +10^{-5}/°C$.

In accordance with one exemplary embodiment of the present disclosure, the Si—O-M bonds may be in a ratio of 2% to 20% by weight.

In accordance with one exemplary embodiment of the present disclosure, the metallic element may be one of Ti, Zr and Al.

In accordance with one exemplary embodiment of the present disclosure, the Si—O-M bond may be one of Si—O—Ti, Si—O—Zr and Si—O—Al bonds.

In accordance with one exemplary embodiment of the present disclosure, the Si—O-M bond may be the Si—O—Ti bond, and the Ti may be in a ratio of 2% to 20% by weight.

In accordance with one exemplary embodiment of the present disclosure, the Si—O-M bond may be the Si—O—Zr bond and the Zr may be in a ratio of 2% to 8% by weight.

In accordance with one exemplary embodiment of the present disclosure, the Si—O-M bond may be the Si—O—Al bond and the Al may be in a ratio of 2% to 10% by weight.

A colorless composite material according to exemplary embodiments of the present disclosure may include glass fibers, and inorganic-organic hybrid resin consisting of inorganic bonds and organic bonds. Here, the inorganic bonds may be M-O-M bonds and M may denote a metallic element.

A colorless composite material according to exemplary embodiments of the present disclosure may include glass fibers, and inorganic-organic hybrid resin consisting of inorganic bonds and organic bonds. Here, the inorganic bonds may be one of Si—O—Ti, Si—O—Zr and Si—O—Al bonds and a thermo-optic coefficient of the inorganic-organic hybrid resin may be $-5 \times 10^{-5}/°C. \sim +10^{-5}/°C$.

To achieve these and other advantages and in accordance with the purpose of the present invention, as embodied and broadly described herein, there is provided a method for manufacturing a colorless composite material, the method including, manufacturing inorganic-organic hybrid resin consisting of inorganic bonds and organic bonds, impregnating the glass fibers with the inorganic-organic hybrid resin, and manufacturing a colorless composite material by performing heat curing or UV curing for the impregnated materials. Here, the inorganic bonds may be Si—O—Si bonds or Si—O-M bonds and M may denote a metallic element.

Advantageous Effect

In accordance with the detailed description of a colorless composite material and a manufacturing method thereof, transparency of the colorless composite material (or a transparent substrate) may be retained within a wide temperature range by way of adjusting a ratio of inorganic bonds (Si—O—Si bonds) within inorganic-organic hybrid resin contained in the colorless composite material.

In accordance with the detailed description of a colorless composite material and a manufacturing method thereof, transparency of the colorless composite material (or a transparent substrate) may be retained within a wide temperature range by way of adding a metallic element to inorganic bonds (Si—O-M or M-O-M bonds) within inorganic-organic hybrid resin contained in the colorless composite material.

BRIEF DESCRIPTION OF THE DRAWINGS

FIG. 3 is a flowchart showing a method for manufacturing a colorless composite material in accordance with a second exemplary embodiment.

MODES FOR CARRYING OUT THE PREFERRED EMBODIMENTS

Figure 1:
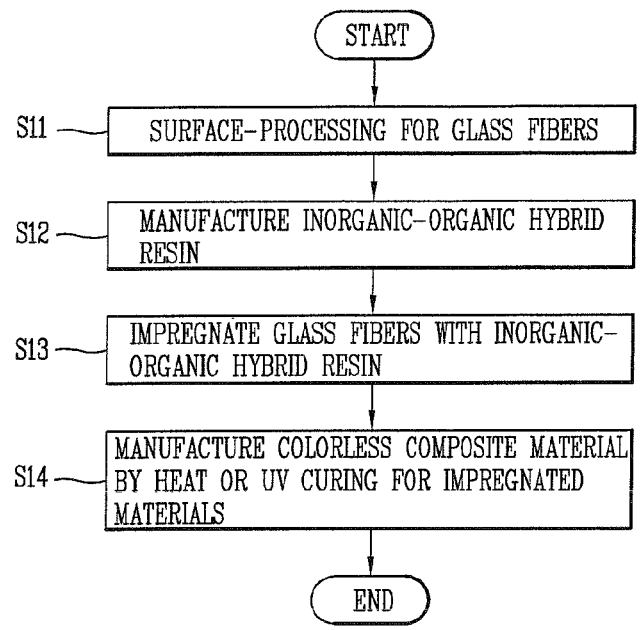
FIG. 1 is a flowchart illustrating a method for manufacturing a colorless composite material in accordance with a first exemplary embodiment.

It should be noted that technological terms used herein are merely used to describe a specific embodiment, but not to limit the present invention. Also, unless particularly defined otherwise, technological terms used herein should be construed as a meaning that is generally understood by those having ordinary skill in the art to which the invention pertains, and should not be construed too broadly or too narrowly. Furthermore, if technological terms used herein are wrong terms unable to correctly express the spirit of the invention, then they should be replaced by technological terms that are properly understood by those skilled in the art. In addition, general terms used in this invention should be construed based on the definition of dictionary, or the context, and should not be construed too broadly or too narrowly.

Incidentally, unless clearly used otherwise, expressions in the singular number include a plural meaning. In this application, the terms "comprising" and "including" should not be construed to necessarily include all of the elements or steps disclosed herein, and should be construed not to include some of the elements or steps thereof, or should be construed to further include additional elements or steps.

Furthermore, the terms including an ordinal number such as first, second, etc. can be used to describe various elements, but the elements should not be limited by those terms. The terms are used merely for the purpose to distinguish an element from the other element. For example, a first element may be named to a second element, and similarly, a second element may be named to a first element without departing from the scope of right of the invention.

Hereinafter, preferred embodiments of the present invention will be described in detail with reference to the accompanying drawings, and the same or similar elements are designated with the same numeral references regardless of the numerals in the drawings and their redundant description will be omitted.

In describing the present invention, moreover, the detailed description will be omitted when a specific description for publicly known technologies to which the invention pertains is judged to obscure the gist of the present invention. Also, it should be noted that the accompanying drawings are merely illustrated to easily explain the spirit of the invention, and therefore, they should not be construed to limit the spirit of the invention by the accompanying drawings.

Hereinafter, description will be given of a colorless composite material in accordance with a first exemplary embodiment with reference to FIGS. 1 and 2. A colorless composite material in accordance with exemplary embodiments of the present disclosure may be applied to various types of display panels, such as display panels for organic light emitting diodes (OLEDs) as well as liquid crystal displays (LCDs), plasma display panels (PDPs), display panels for field emitting displays (FEDs) and the like. Also, the colorless composite material according to the exemplary embodiments may be used as a substituent material for flexible substrates, optical substrates (for example, solar cell, etc.) and glass substrate.

In general, a colorless material may be manufactured by impregnating glass fibers (glass) with typical resin having the same refractive index as the glass fibers. However, although the glass fibers and the resin seem to be transparent owing to having the same refractive index at room temperature, transparency of the colorless material is drastically lowered as the temperature changes. This arises from a thermooptic effect that the refractive indexes of the glass fiber and the resin are varied in response to the temperature change.

The thermooptic effect is represented by a thermooptic coefficient (dn/dT) as the refractive index variation according to temperature. The glass fiber as an inorganic material and the resin as an organic material are materials exhibiting a great difference in thermooptic coefficient. The thermooptic coefficient of the glass fiber is approximately $+10^{-5}/^\circ$ C. and the thermooptic coefficient of the resin as the organic material is approximately $-10^{-4}/^\circ$ C. That is, with an increase in temperature, the refractive index of the inorganic glass fiber increases but that of the organic resin decreases. The organic material generally exhibits the greater variation of the refractive index over 10 times than the inorganic material. A drastic change in transparency and haze of the colorless material may be caused in response to the temperature change. For example, a colorless material which retains its transparency at temperature of 25° C. may become opaque due to the thermooptic effect at temperature of 80° C.

Hereinafter, description will be given in detail of a colorless composite material (or a transparent substrate) capable of retaining its transparency within a wide temperature range by adjusting a thermooptic coefficient of resin. Glass fibers used in the colorless composite material may be difficult to easily change compositions in consideration of fibrosis, knittability and the like, and also does not exhibit a great change in the thermooptic coefficient by the variation of the composition. Therefore, it may be better to adjust the thermooptic coefficient of the resin.

The exemplary embodiments of the present disclosure employ inorganic-organic hybrid materials as resin materials contained in the colorless composite material. The inorganic-organic hybrid materials may be manufactured by a sol-gel method including a hydrolysis process and a condensation reaction, by reacting organic hallogensilane with silicon alkoxide or alkylether, or by a non-hydrolytic reaction without using water.

The inorganic-organic hybrid materials may be manufactured by using metallic compounds, which may be expressed by one of General Formulas 1 to 3, as a starting material.

$(OR^1)_n M-R^2_m (n+m=4)$      [General Formula 1]

$(OR^1)_n M-(X-R^3)_m (n+m=4)$      [General Formula 2]

$R^4 MCl_3$      [General Formula 3]

In General Formulas 1 to 3, M denotes a metallic element containing silicon (Si), $R^1 \sim R^4$ denote organic materials. $R^1$ denotes a straight chain alkyl group or a side chain alkyl group such as methyl, ethyl, propyl, butyl and the like each having 1 to 10 carbon atoms, or hydrogen atoms obtained from the group by hydrolysis. $R^2$ denotes a straight chain or side chain alkyl group, phenyl group, phenyl alkoxyl group or amine group. Also, n denotes a natural number in the range of 1 to 4 and m denotes an integer in the range of 0 to 3.

X denotes a carbon chain with 3 to 6 carbon atoms, $R^3$ denotes a material (hereinafter, referred to as fluorocarbon) containing a vinyl group, glycydoxy group and methacryl group or a material that fluoride atoms substitutes for carbon atoms on a carbon chain having 4 to 8 carbon atoms.

$R^4$ denotes fluorocarbon, which contains a straight chain or side chain alkyl group having 1 to 10 carbon atoms or hydrogen atoms, phenyl group, phenyl alkoxyl group, amine group, vinyl group, glycydoxy group or methacryl group, or fluorocarbon in which fluoride atoms substitute for carbon atoms on a carbon chain having 4 to 8 carbon atoms.

Examples of compounds belonging to General Formulas 1 to 3, in detail, may include tetramethoxysilane, tetraethoxysilane, tetrapropoxysilane, tetrabutoxysilane, vinyltriethoxysilane, vinyltrimethoxysilane, vinyltripropoxysilane, vinyltriacetoxysilane, vinyldimethoxyethoxysilane, aminoprophyltriethoxysilane, aminoprophyltrimethoxysilane, aminoprophyltripropoxysilane, N-(3-acryloxy-2-hydroxyprophyl)-3-aminoprophyltriethoxysilane, N-(3-acryloxy-2-hydroxyprophyl)-3-aminoprophyltrimethoxysilane, 3-acryloxyprophyldimethoxysilane, 3-acryloxyprophyldiethoxysilane, 3-acryloxyprophyldipropoxysilane, 3-(meth)acryloxyprophyltrimethoxysilane, 3-(meth)acryloxyprophyltriethoxysilane, 3-(meth)acryloxyprophyltripropoxysilane, N-(2-aminoethyl-3-aminoprophyl)-trimethoxysilane (DIAMO), N-(2-aminoethyl-3-aminoprophyl)-triethoxysilane, N-(2-aminoethyl-3-aminoprophyl)-tripropoxysilane, N-(2-aminoethyl-3-aminoprophyl)-tributoxysilane, trimethoxysilylpropyldiethylenetriamine (TRIAMO), triethoxysilylpropyldiethylenetriamine, tripropoxysilylpropyldiethylenetriamine, tributoxysilylpropyldiethylenetriamine, 2-glycydoxyethylmethoxysilane, 3-glycydoxyprophyltrimethoxysilane, 3-glycydoxyprophyltriethoxysilane, 2-glycydoxyprophyltrimethoxysilane, 2-glycydoxyprophyltriethoxysilane, 2-glycydoxyethylmethyldimethoxysilane, 2-glycydoxyethylmethyldiethoxysilane, 3-glycydoxyethylmethyldimethoxysilane, 3-glycydoxypropyleth-yldimethoxysilane, 3-glycydoxyprophyleth-yldimethoxysilane, 3-glycydoxyprophylethyldiethoxysilane, 2-glycydoxyprophylethyldiethoxysilane, 2-glycydoxyprophyleth-yldimethoxysilane, 2-(3,4-ethoxycyclohexyl)ethyltrimethoxysilane, 2-(3,4-ethoxycyclohexyl)ethyltriethoxysilane, ethyltrimethoxysilane, methyltriethoxysilane, 3-chloroprophyltrimethoxysilane, 3-chioroprophyltrimpropoxysilane, 2-chloroprophyltributoxysilane, phenyltrimethoxysilane, phenyltriethoxysilane, 3,3,3-trifluoroprophyltrimethoxysilane, dimethyldimethoxysilane, 3-chloroprophylmethyldimethoxysilane, methyltrichlorosilane, ethyltrichlorosilane, phenyltrichlorosilane, vinyltrichlorosilane, hexyltrichlorosilane or decyltrichlorosilane. The aforementioned General Formulas 1 to 3 have also been described in Korean Patent Application No. 10-2004-0033965, so detailed description thereof will be omitted.

In order to retain transparency of a colorless composite material (or a transparent substrate) within a wide temperature range by adjusting a thermooptic coefficient of inorganic-organic hybrid resin contained in the colorless composite material according to an exemplary embodiment of the present disclosure, a ratio of inorganic bonds (for example, Si—O—Si bonds) to organic bonds within the inorganic-organic hybrid resin may be adjusted such that the thermooptic coefficient of the inorganic-organic hybrid resin (i.e., inorganic-organic hybrid resin with a low thermooptic coefficient) can be adjusted into $-5 \times 10^{-5}/°$ C.~$+10^{-5}/°$ C.

The inorganic-organic hybrid resin may have a variable thermooptic coefficient according to ratios and/or types of inorganic and organic materials. The thermooptic coefficient of the inorganic-organic hybrid resin may thus be decided by combination of the thermooptic coefficient of each bond.

Therefore, in order to make the thermooptic coefficient of the inorganic-organic hybrid resin close to the thermooptic coefficient of glass fiber consisting of inorganic materials, it may be necessary to increase the ratio of the inorganic materials (i.e., inorganic bonds) within the inorganic-organic hybrid resin.

A difference of refractive index in response to a temperature change may be reduced as the thermooptic coefficients of the inorganic-organic hybrid resin and the glass fibers are closer (more similar) to each other. This may allow for use of the colorless composite material within a wide temperature range.

In order to adjust the thermooptic coefficient of the inorganic-organic hybrid resin into $-5 \times 10^{-5}/°$ C.~$+10^{-5}/°$ C., if it is assumed that the inorganic-organic hybrid resin is 100% by weight, the inorganic bonds (for example, Si—O—Si bonds) within the inorganic-organic hybrid resin may be over 30% by weight or in a ratio of 40% to 60% by weight. Here, the organic bonds within the inorganic-organic hybrid resin may be below 70% by weight or in a ratio of 60% to 40% by weight. The organic bond may be a bond such as methyl (—CH3), ethyl (—C2H5), phenyl (—C6H5) and the like.

Hereinafter, description will be given of a method for manufacturing a colorless composite material in accordance with a first exemplary embodiment.

FIG. 1 is a flowchart illustrating a method for manufacturing a colorless composite material in accordance with a first exemplary embodiment.

First, surfaces of glass fibers (glass fabrics) may be processed through a typical surface processing (S11). For example, the surfaces of the glass fibers (glass fabrics) may be processed to impregnate the glass fibers with inorganic-organic hybrid resin.

The inorganic-organic hybrid resin may be manufactured through a sol-gel method (S12). The inorganic-organic hybrid resin may be manufactured by a sol-gel method including a hydrolysis process and a condensation reaction, by reacting organic hallogensilane with silicon alkoxide or alkylether, or by a non-hydrolytic reaction without using water.

A ratio of Si—O—Si bonds within the inorganic-organic hybrid resin may be adjusted after the inorganic-organic hybrid resin is manufactured based on one of General Formulas 1 to 3 as aforementioned, or adjusted when the inorganic-organic hybrid resin is manufactured based on one of General Formulas 1 to 3. For example, the inorganic-organic hybrid resin may be expressed by General Formula 1, and the ratio of the inorganic bonds/organic bonds may be adjusted by changing $R^2$ or n and m. Or, the inorganic-organic hybrid resin may be manufactured by synthesizing Si—O—Si bonds over 30% by weight or in a ratio of 40 to 60% by weight with the organic bonds.

The surface-processed glass fibers may be impregnated with the inorganic-organic hybrid resin (S13).

The colorless composite material may be manufactured by performing heat curing or UV curing for the impregnated materials (S14). The impregnated materials may be prepregged in one direction, the prepregged layers may be deposited (laminated), and the deposited layers may be compressed with applying heat, thereby manufacturing the colorless composite material.

Figure 2:
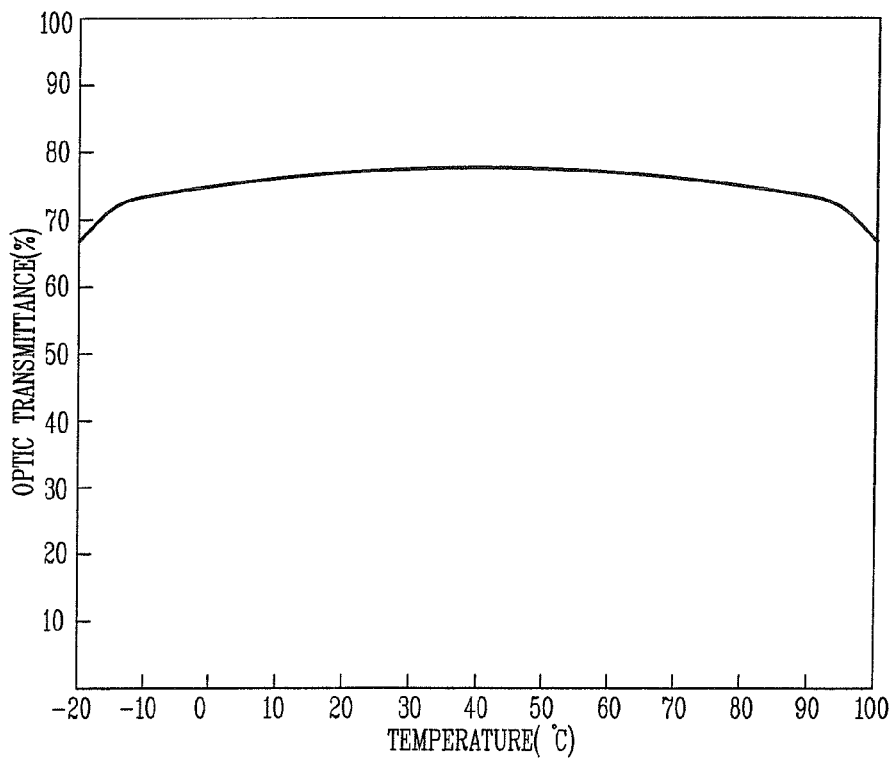
FIG. 2 is a view illustrating experimental results in accordance with exemplary embodiments.

FIG. 2 is a view illustrating experimental results in accordance with exemplary embodiments.

As illustrated in FIG. 2, in order to adjust the thermooptic coefficient of the inorganic-organic hybrid resin into $-5 \times 10^{-5}/°$ C.~$+10^{-5}/°$ C., if it is assumed that the inorganic-organic hybrid resin is 100% by weight, the inorganic bonds (for example, Si—O—Si bonds) within the inorganic-organic hybrid resin may be adjusted to be over 30% by weight or in a ratio of 40% to 60% by weight. This may allow for manufacturing a colorless composite material which maintains optical transmittance over 75% and haze less than 15% within a wide temperature range between −10° C. and 80° C.

Therefore, in accordance with the colorless composite material and the manufacturing method thereof according to the first exemplary embodiment, the transparency of the colorless composite material (or a transparent substrate) may be retained within the wide temperature range by adjusting the ratio of the inorganic bonds (for example, Si—O—Si bonds) within the inorganic-organic hybrid resin contained in the colorless composite material.

Meanwhile, in order to adjust the thermooptic coefficient of the inorganic-organic hybrid resin into $-5 \times 10^{-5}/°$ C.~$+10^{-5}/°$ C., the inorganic bonds within the inorganic-organic hybrid resin may be manufactured using a metallic element. Hereinafter, description will be given of a method for manufacturing a colorless composite material using inorganic bonds containing a metallic element with reference to FIG. 3.

Hereinafter, a method for manufacturing a colorless composite material in accordance with a second exemplary embodiment will be described with reference to FIG. 3.

FIG. 3 is a flowchart showing a method for manufacturing a colorless composite material in accordance with a second exemplary embodiment.

First, surfaces of glass fibers (glass fabrics) may be processed through a typical surface processing (S21). For example, the surfaces of the glass fibers (glass fabrics) may be processed to impregnate the glass fibers with inorganic-organic hybrid resin.

The inorganic-organic hybrid resin containing the metallic element may be manufactured by a sol-gel method (S22). The inorganic-organic hybrid resin may be manufactured by a sol-gel method including a hydrolysis process and a condensation reaction, by reacting organic hallogensilane with silicon alkoxide or alkylether, or by a non-hydrolytic reaction without using water.

A ratio of inorganic bonds (for example, Si—O-M bonds or M-O-M bonds) within the inorganic-organic hybrid resin may be adjusted after the inorganic-organic hybrid resin is manufactured based on one of General Formulas 1 to 3 as aforementioned, or adjusted when the inorganic-organic hybrid resin is manufactured based on one of General Formulas 1 to 3. The inorganic-organic hybrid resin may be expressed by General Formula 1, and the ratio of the inorganic bonds/organic bonds may be adjusted by changing $R^2$ or n and m. Or, the inorganic-organic hybrid resin may be manufactured by synthesizing the inorganic bonds over 30% by weight or in a ratio of 40% to 60% by weight with the organic bonds.

In order to adjust the thermooptic coefficient of the inorganic-organic hybrid resin into $-5 \times 10^{-5}/°C. \sim +10^{-5}/°C.$, if it is assumed that the inorganic-organic hybrid resin is 100% by weight, the inorganic bonds (for example, Si—O-M bonds or M-O-M bonds) within the inorganic-organic hybrid resin may be adjusted into a ratio of 30% to 60% by weight. Here, the organic bonds within the inorganic-organic hybrid resin may be in a ratio of 70% to 40% by weight. The organic bonds may be bonds such as methyl (—CH3), ethyl (—C2H5), phenyl (—C6H5) and the like.

The inorganic bonds, namely, Si—O-M bonds or M-O-M bonds, may contain a metallic element M. For example, the metallic element may be one of Ti, Zr and Al, and the Si—O-M bonds or M-O-M bonds may be in a ratio of 30% to 60% by weight.

In order to adjust the thermooptic coefficient of the inorganic-organic hybrid resin into $-5 \times 10^{-5}/°C. \sim +10^{-5}/°C.$, the Si—O-M bonds or M-O-M bonds may be one of Si—O—Ti, Si—O—Zr and Si—O—Al bonds. For example, the Si—O-M bond may be the Si—O—Ti bond and the Ti may be in a ratio of 2 to 20% by weight. The Si—O-M bond may be the Si—O—Zr bond and the Zr may be in a ratio of 2 to 8% by weight. Also, the Si—O-M bond may be the Si—O—Al bond and the Al may be in a ratio of 2 to 10% by weight.

In order to adjust the thermooptic coefficient of the inorganic-organic hybrid resin into $-5 \times 10^{-5}/°C. \sim +10^{-5}/°C.$, the M-O-M bonds may merely be consisting of metallic elements. For example, the M-O-M bond may be Ti—O—Ti bond and the Ti may be in a ratio of 2 to 20% by weight. The M-O-M bond may be Al—O—Al bond and the Al may be in a ratio of 2 to 10% by weight. Also, the M-O-M bond may be Zr—O—Zr bond and the Zr may be in a ratio of 2 to 8% by weight.

The surface-processed glass fibers may be impregnated with the inorganic-organic hybrid resin (S23).

The colorless composite material may be manufactured by performing heat curing or UV curing for the impregnated materials (S24).

As illustrated in FIG. 2, in order to adjust the thermooptic coefficient of the inorganic-organic hybrid resin into $-5 \times 10^{-5}/°C. \sim +10^{-5}/°C.$, if it is assumed that the inorganic-organic hybrid resin is 100% by weight, the inorganic bonds (for example, M-O-M bonds) within the inorganic-organic hybrid resin may be adjusted into a ratio of 30% to 60% by weight. This may allow for manufacturing a colorless composite material which maintains an optical transmittance over 75% and haze less than 15% within a wide temperature range between $-10°$ C. and $80°$ C.

Therefore, in accordance with the colorless composite material and the manufacturing method thereof according to the second exemplary embodiment, transparency of the colorless composite material (or a transparent substrate) may be retained within the wide temperature range by adding the metallic element to the inorganic bonds (for example, Si—O-M bonds or M-O-M bonds) within the inorganic-organic hybrid resin contained in the colorless composite material.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

INDUSTRIAL APPLICABILITY

As described above, in accordance with a colorless composite material and a manufacturing method thereof according to exemplary embodiments, transparency of the colorless composite material (or a transparent substrate) may be retained within a wide temperature range by adjusting a ratio of inorganic bonds (Si—O—Si bonds) within inorganic-organic hybrid resin contained in the colorless composite material.

Also, in accordance with a colorless composite material and a manufacturing method thereof according to exemplary embodiments, transparency of the colorless composite material (or a transparent substrate) may be retained within a wide temperature range by adding a metallic element M to inorganic bonds (Si—O-M bonds or M-O-M bonds) within inorganic-organic hybrid resin contained in the colorless composite material.

The invention claimed is:
1. A colorless composite material comprising:
   glass fibers; and
   inorganic-organic hybrid resin consisting of inorganic bonds and organic bonds,
   wherein the inorganic bonds are Si—O-M bonds, and M is one of Ti, Zr and Al,
   with the proviso that when the Si-O-M bond is the Si—O-Ti bond, the amount of Ti is 2% to 20% by weight,
   when the Si—O-M bond is the Si—O-Zr bond, the amount of Zr is 2% to 8% by weight, and
   when the Si—O-M bond is the Si—O-Al bond, the amount of Al is 2% to 10% by weight,
   all weight percentages being based on the total weight of the inorganic-organic hybrid resin, and
   wherein the inorganic-organic hybrid resin has a thermooptic coefficient of $-5 \times 10^{-5}/°$ C. $\sim +10^{-5}/°$ C.

* * * * *